(12) United States Patent
Hallett

(10) Patent No.: US 8,546,970 B2
(45) Date of Patent: Oct. 1, 2013

(54) TURBINE FOR A FLUID STREAM

(75) Inventor: Jamie Hallett, Clairmont (CA)

(73) Assignee: 1444555 Alberta Ltd., Grande Prairie, Alberta (CA)

( * ) Notice: Subject to any disclaimer, the term of this patent is extended or adjusted under 35 U.S.C. 154(b) by 361 days.

(21) Appl. No.: 12/911,122

(22) Filed: Oct. 25, 2010

(65) Prior Publication Data

US 2011/0254273 A1 Oct. 20, 2011

Related U.S. Application Data

(60) Provisional application No. 61/326,114, filed on Apr. 20, 2010.

(51) Int. Cl.
*F03B 13/00* (2006.01)
*H02P 9/04* (2006.01)

(52) U.S. Cl.
USPC .......................................................... 290/54

(58) Field of Classification Search
USPC .......................................... 290/54, 55, 43, 44
See application file for complete search history.

(56) References Cited

U.S. PATENT DOCUMENTS

| | | | |
|---|---|---|---|
| 4,665,704 A | 5/1987 | Hartwig | |
| 4,745,754 A | 5/1988 | Kawamura | |
| 4,805,409 A | 2/1989 | Kobayashi | |
| 4,892,138 A | 1/1990 | Bibik, Jr. | |
| 5,512,788 A | 4/1996 | Berenda et al. | |
| 5,632,599 A | 5/1997 | Townsend | |
| 5,863,180 A * | 1/1999 | Townsend | 416/42 |
| 5,998,882 A | 12/1999 | Alston | |
| 6,015,258 A | 1/2000 | Taylor | |
| 6,365,985 B1 | 4/2002 | Cohen | |
| 6,465,899 B2 | 10/2002 | Roberts | |
| 6,740,989 B2 | 5/2004 | Rowe | |
| 7,104,060 B2 | 9/2006 | Ogawa et al. | |
| 7,109,599 B2 | 9/2006 | Watkins | |
| 7,116,006 B2 | 10/2006 | McCoin | |
| 7,215,038 B2 | 5/2007 | Bacon | |
| 7,417,334 B2 | 8/2008 | Uchiyama | |

\* cited by examiner

*Primary Examiner* — Javaid Nasri
(74) *Attorney, Agent, or Firm* — Davis & Bujold, PLLC; Michael J. Bujold

(57) ABSTRACT

A turbine for a fluid stream has a support structure, a cage rotor, and a generator. The cage rotor is rotated about a first axis by motive fluids moving with a component perpendicular to the first axis. The cage rotor is pivotally mounted to the support structure about a second axis that is perpendicular to the first axis. A generator is driven by the rotation of the cage rotor. An actuator adjusts the pivotal position of the cage rotor relative to the support structure.

16 Claims, 5 Drawing Sheets

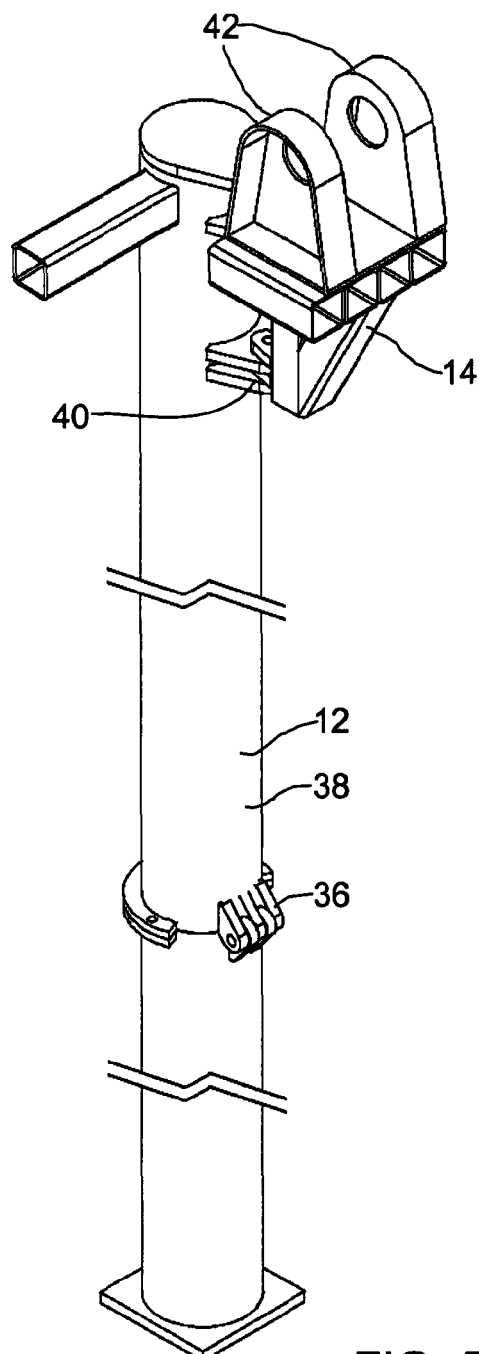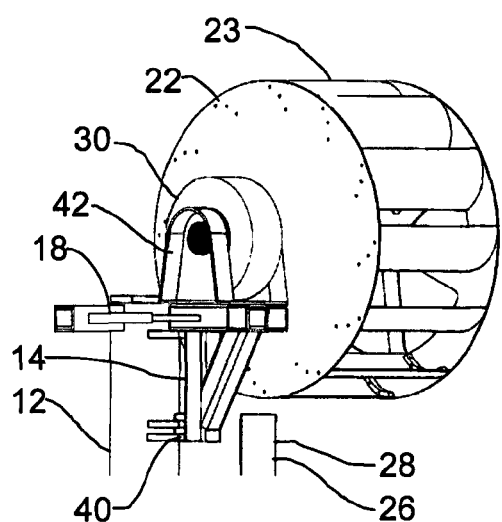
FIG. 5
FIG. 6

TURBINE FOR A FLUID STREAM

FIELD

This relates to a turbine that generates electricity from a fluid stream, such as an exhaust stream.

BACKGROUND

U.S. Pat. No. 6,365,985 (Cohen) entitled "Electricity Generation from Air Conditioning Exhaust" describes a type of generator that runs off the exhaust from an air conditioner.

SUMMARY

According to one aspect, there is provided a turbine for a fluid stream, comprising a support structure, a cage rotor, and a generator. The cage rotor is rotated about a first axis by motive fluids moving with a component perpendicular to the first axis. The cage rotor is pivotally mounted to the support structure about a second axis that is perpendicular to the first axis. A generator is driven by the rotation of the cage rotor. An actuator adjusts the pivotal position of the cage rotor relative to the support structure.

According to another aspect, the cage rotor comprises blades along an outer periphery of the cage rotor that are driven by the motive fluids.

According to another aspect, the first axis is horizontal, and the second axis is vertical.

According to another aspect, there is provided, in combination, a source of motive fluids generating a fluid stream, and a turbine as described above.

According to another aspect, the support structure of the turbine is mounted on the ground, or is mounted directly or indirectly to the source of motive fluids.

According to another aspect, the source of motive fluid is a combustion source, and the fluid stream is a stream of combustion products.

According to another aspect, there is provided a method of generating power, comprising the steps of: providing a turbine comprising a support structure, a cage rotor that rotates about a first axis, the cage rotor being pivotally mounted to the support structure about a second axis that is perpendicular to the first axis, and a generator driven by the rotation of the cage rotor to generate power; mounting the support structure adjacent to a fluid stream generated by a source of motive fluids; pivoting the cage support about the second axis to position the cage rotor within the fluid stream; and generating power by causing the fluid stream to rotate the cage rotor.

According to another aspect, providing a support structure comprises mounting the support structure on the ground, or mounting the support structure directly or indirectly to the source of motive fluids.

According to another aspect, the source of motive fluid is a combustion source, and the fluid stream is a stream of combustion products.

According to another aspect, the method further comprises the step of mounting the support structure and pivoting the cage support such that the first axis of the cage is substantially perpendicular to prevailing winds.

According to another aspect, the first axis is horizontal and the second axis is perpendicular.

In one embodiment, the method and apparatus may be used to capture energy from a waste stream and utilize it for power generation purposes. The components for the process are currently: a generator, such as a direct drive or wind generator, controller, inverter, a tower component, an actuator and an engineered cage style propeller and remains a self supporting structure, independent of any other component. The apparatus may be employed by placing the cage in the exhaust stream, which may be, for example, waste fluids or combustion products; causing the exhaust stream to drive the generator by rotating or propelling the cage around an axis, which creates an electrical charge. The electrical charge flows through the controller, through the inverter and directly to an electrical current destination, such as a battery bank, grid connection, or electrically powered equipment.

BRIEF DESCRIPTION OF THE DRAWINGS

These and other features will become more apparent from the following description in which reference is made to the appended drawings, the drawings are for the purpose of illustration only and are not intended to be in any way limiting, wherein:

FIG. 5 is a perspective view of an alternative support structure.

FIG. 6 is a detailed perspective view of the turbine mounted on the support structure.

DETAILED DESCRIPTION

Figure 1:
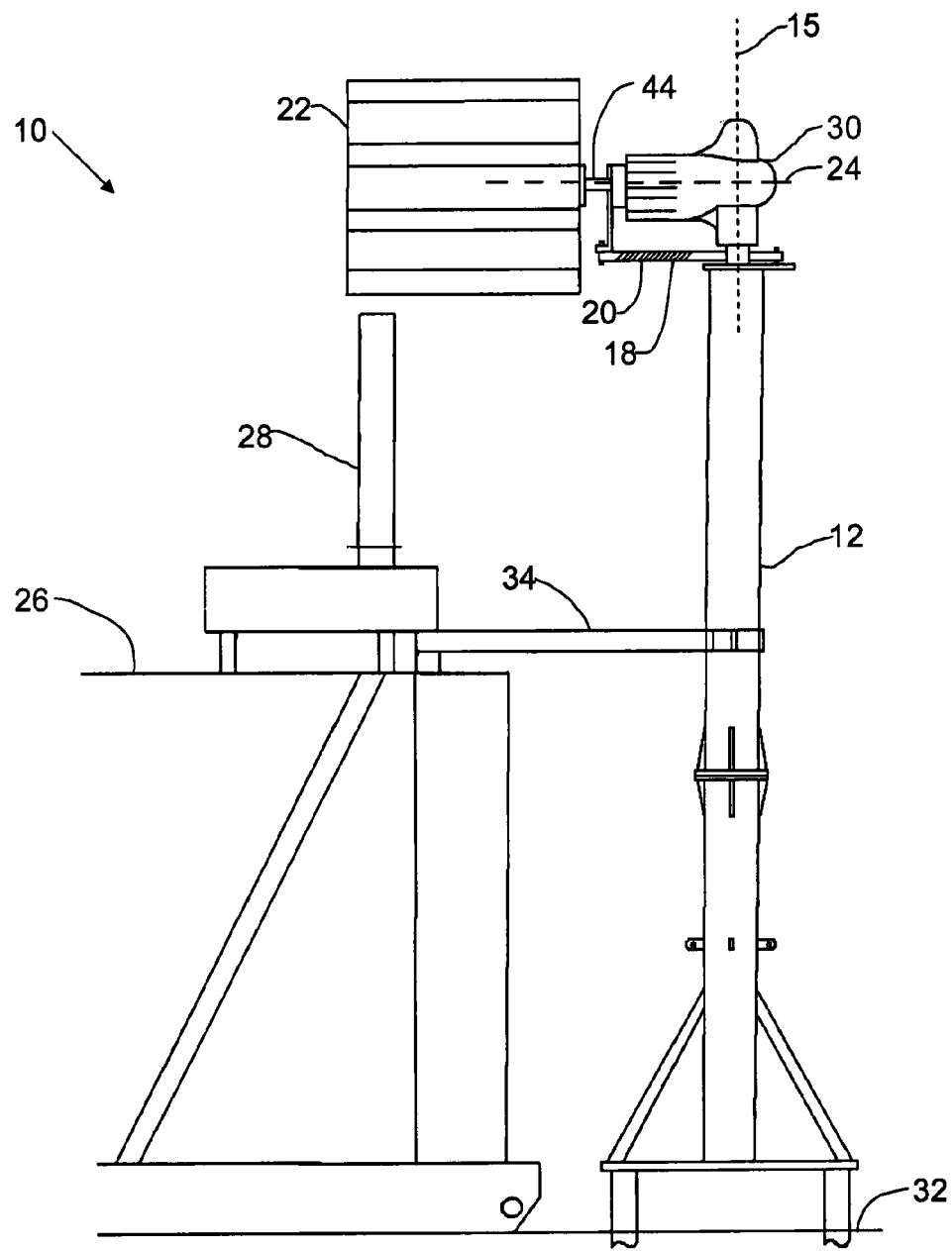
FIG. 1 is a side elevation view of a turbine installed by a source of exhaust gas.

The turbine for an exhaust stream generally identified by reference numeral 10, will now be described with reference to FIG. 1 through 8.

Figure 2:
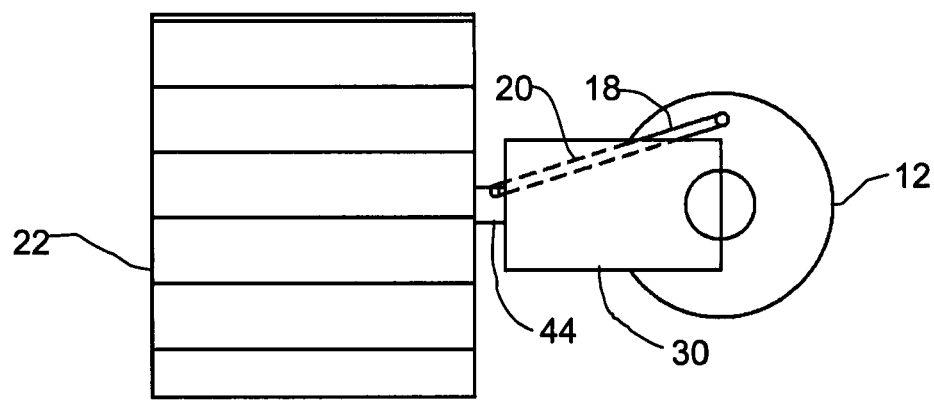
FIG. 2 is a top plan view of the turbine.

Turbine 10 has a support structure 12, and a cage rotor 22 pivotally mounted to support structure 12 about an axis 15. As shown, cage rotor 22 is mounted to support structure 12 via a generator 30. Cage rotor 22 is connected to generator 30 by a connector 44. Other designs may also be used to mount cage rotor 22 to support structure 12, such as a generator support 14 as shown in FIGS. 5 and 6. There is an actuator 18 for controlling the pivotal position of cage support 14 relative to the support structure about axis 14. Referring to FIG. 2, as shown, actuator 18 is a threaded rod 20 that is connected between cage support 14 and support structure 12 and offset from the pivot axis of cage support 14. Rotating threaded rod 20 allows the pivotal position of cage rotor 22 relative to the source of motive fluids 28 to be adjusted to maximize the efficiency of turbine 10. Alternatively, actuator 18 may take other forms used to control the pivotal position of two components that are well known in the art. For example, it could be a piston having a similar arrangement, a gear or belt-driven mechanism within support structure 12, or other types of known actuators. Actuator 18 may be controlled by various means, such as electrical, hydraulic, mechanical, etc. means, and may be adjusted manually, or adjusted using automated equipment.

Referring to FIG. 1, a cage rotor 22 having a rotational axis 24 that is perpendicular to axis 15 is mounted to cage support 14. In the depicted embodiment, rotational axis 24 is horizontal, and axis 15 is vertical. Cage rotor 22 is driven by motive fluids moving with a component perpendicular to rotational axis 24 to generate power. As shown, cage rotor 22 is mounted above a source of exhaust 26 in the stream of exhaust fluids that exit an exhaust pipe 28. Cage support 14 is pivoted such that cage rotor 22 is contacted by fluids from exhaust pipe 28 at a point that optimizes power generation. This will vary depending on the cage rotor 22 used, the velocity of the exhaust gases, and other factors. As cage rotor 22 is driven, it generates power in a generator 30. The power generated may then be transmitted to, for example, the power grid or a bank of electrical storage devices, or used in any preferred manner, such as by onsite equipment.

Referring to FIG. 5, another example of a support structure 12 is shown. Support structure 12 has a hinge connection 36 along its main body 38 to facilitate the installation and servicing of generator 30 and cage rotor 22. Support structure 12 also has a generator support 14 that is mounted on the side of main body 38 by a hinge 40. Referring to FIG. 6, generator 30 is supported between two flanges 42 and is connected to cage rotor 22 by a connector 44 (shown in FIGS. 7 and 8). Other designs, including designs that support cage rotor 22, will be apparent to those skilled in the art.

Figure 3:
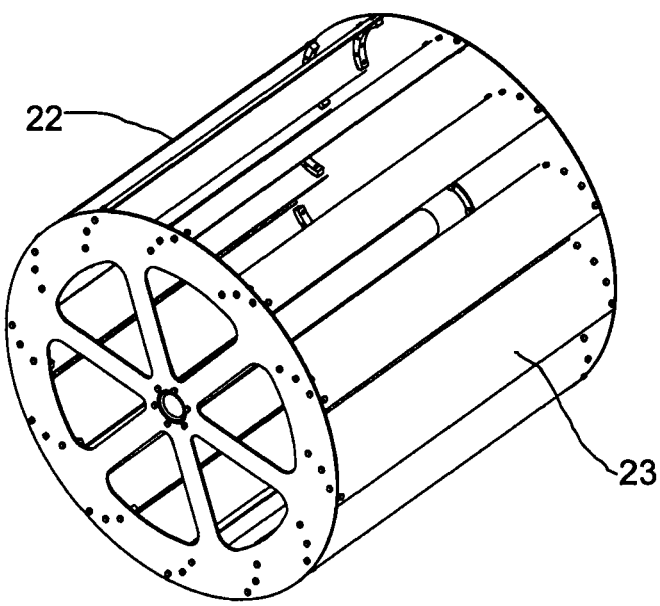
FIG. 3 is a perspective view of a cage.
Figure 4:
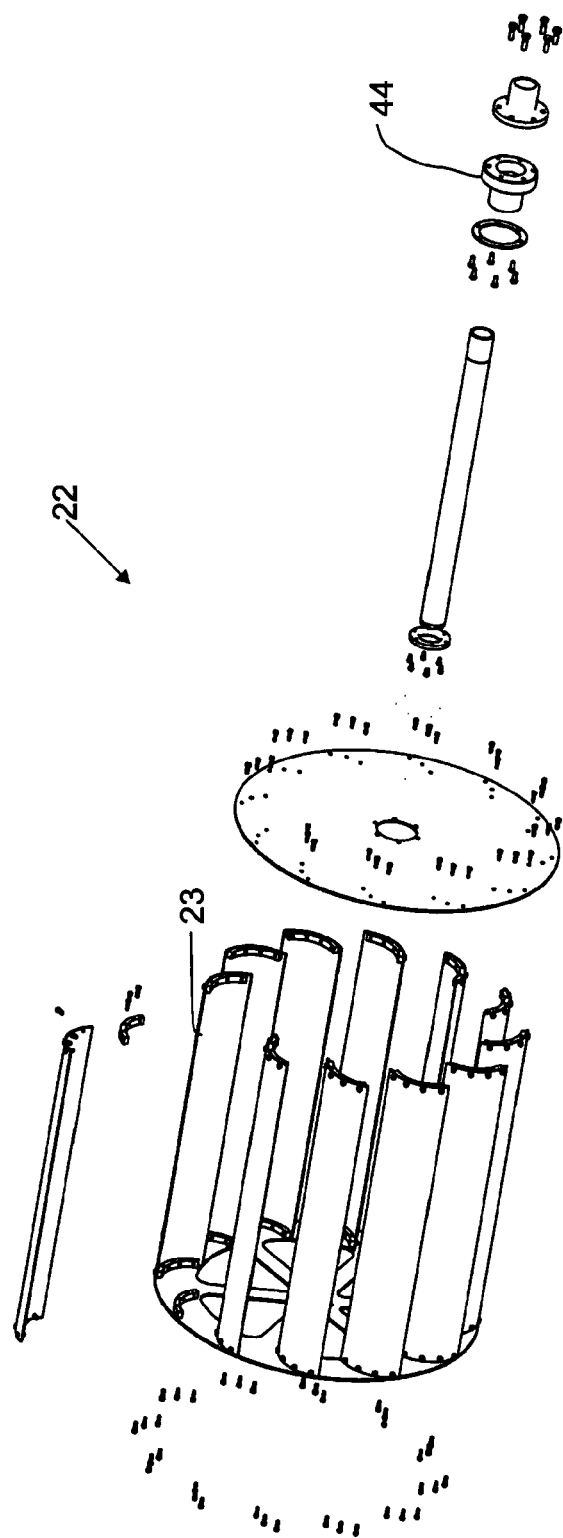
FIG. 4 is an exploded view of the cage.

Referring to FIGS. 3 and 4, cage rotor 22 is shown in greater detail. As shown, cage rotor 22 is made up of a series of blades 23 that are curved to capture fluid pressure in one direction and convert that pressure into rotational movement, and rotates about a hub 46. It will be understood that cage rotor 22 may be made with different dimensions. For example, rotor 22 shown in FIG. 1 is longer than the rotor shown in FIG. 6 relative to the diameter.

Figure 7:
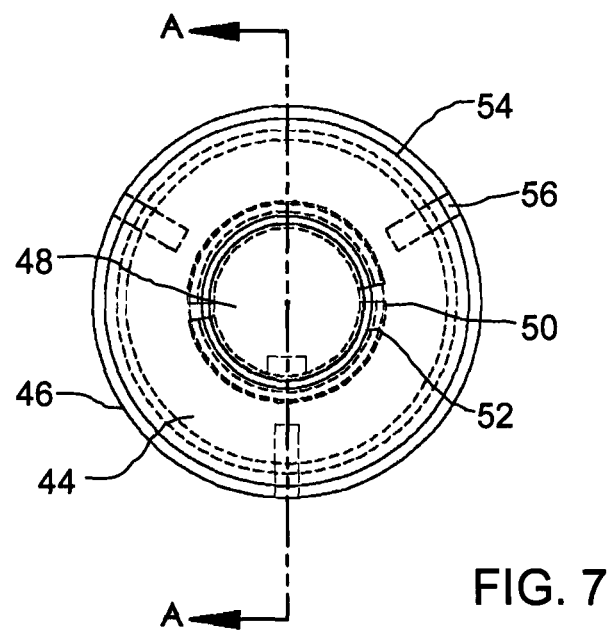
FIG. 7 is an end elevation view of a connector.
Figure 8:
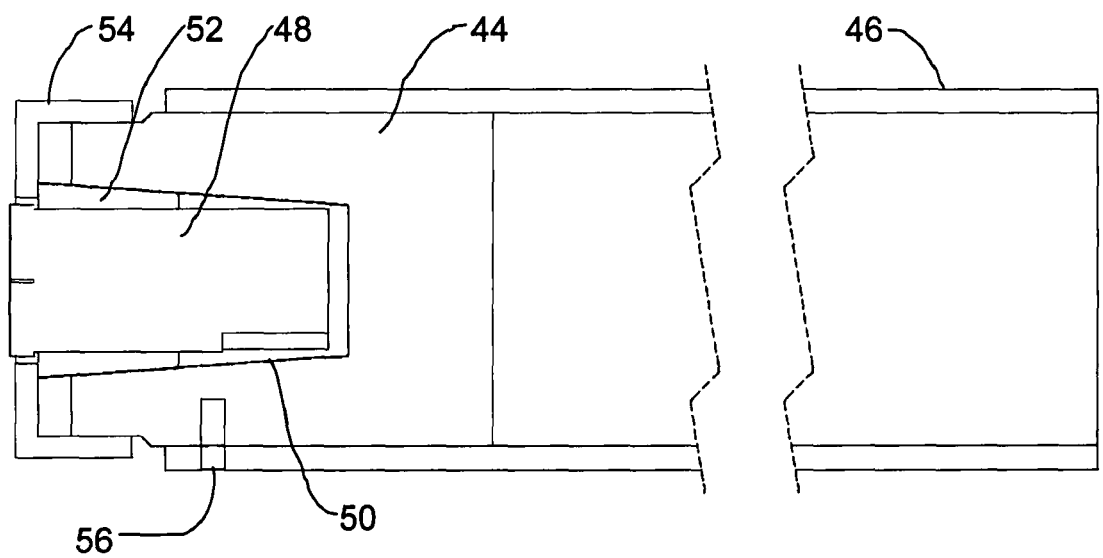
FIG. 8 is a side elevation view in section of the connector.

As mentioned above, cage rotor 22 is connected to generator 30 by a connector 44. One type of connector can be seen in FIG. 4. Another type of connector 44 is shown in FIGS. 7 and 8 to attach cage rotor hub 46 to a generator shaft 48. The depicted connector 44 has a tapered cavity 50 that receives generator shaft 48. Generator shaft 48 is secured within cavity 50 by two locking inserts 52 and a locking cap 54. Locking inserts 52 have tapered outer surfaces that engage cavity 50 and a flat inner surface that engage generator shaft 48. As pressure is applied by locking cap 54, the force exerted on generator shaft 48 by locking inserts 52 is increased. Connector 44 is attached to cage rotor hub 46 by, for example, pin connectors 56.

In a preferred example, the motive fluids will be combustion products, such as the exhaust stream from a diesel engine that generally exit in a vertical direction from a skid-mounted power source. However, it will be understood that other sources of motive fluids may also be used that produce other fluid streams, such as waste gases that are vented. In addition to motive fluids from source of exhaust 26, cage rotor 22 may be driven by wind or other ambient air movement. Referring to FIG. 1, support structure 12 may be positioned relative to source of exhaust 26 such that horizontal rotational axis 24 of cage support 14 is also substantially perpendicular to any prevailing winds in the area, or at least angled such that there is a component of the prevailing winds that is perpendicular to horizontal axis 24, depending on the anticipated strength of the prevailing winds. This allows cage rotor 22 to be rotated by either exhaust 26, or any ambient air movement if the stream of fluids is insufficient to maximize power production in the preferred manner.

Turbine 10 is installed by first mounting support structure 12 adjacent to the fluid stream that is generated by fluid source 26. Support structure 12 may be mounted to the ground 32 as shown in FIG. 1. Alternatively, it may be mounted to fluid source 26, or the structure that also supports fluid source 26. For example, turbine 10 may be used on a large building to capture energy from fluid exhausted out the top, or may be mounted on a skid at a well site with a diesel engine. In particular, the embodiment depicted in FIG. 5 is designed to be mounted on a skid. Referring to FIG. 1, a stabilizing support 34 may be provided to connect support structure 12 to fluid source 26. Cage support 14 is then pivoted using actuator 18 until cage rotor 22 is positioned such that it is driven by the fluid stream from fluid source 26. Cage rotor 22 may also be driven by ambient air movement if fluid source 26 is not operational, or the force driving cage rotor 22 may be supplemented by air movement if fluid source is insufficient to maximize power production.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The following claims are to be understood to include what is specifically illustrated and described above, what is conceptually equivalent, and what can be obviously substituted. Those skilled in the art will appreciate that various adaptations and modifications of the described embodiments can be configured without departing from the scope of the claims. The illustrated embodiments have been set forth only as examples and should not be taken as limiting the invention. It is to be understood that, within the scope of the following claims, the invention may be practiced other than as specifically illustrated and described.

What is claimed is:

1. A turbine for a fluid stream, the turbine comprising:
    a support structure;
    a cage rotor having a first axis and a second axis that is perpendicular to the first axis, the cage rotor rotating about the first axis by motive fluids moving with a component perpendicular to a second axis, the cage rotor being pivotally mounted to the support structure about the second axis;
    a generator driven by the rotation of the cage rotor; and
    an actuator for adjusting the pivotal position of the cage rotor relative to the support structure independently of the movement of the motive fluids.

2. The turbine of claim 1, wherein the cage rotor comprises blades along an outer periphery of the cage rotor that are driven by the motive fluids.

3. The turbine of claim 1, wherein the first axis is horizontal, and the second axis is vertical.

4. The turbine of claim 1, wherein a user controlled controller adjusts the actuator, the position of the cage rotor being specifically defined by the actuator.

5. In combination:
    a source of motive fluids generating a fluid stream; and
    a turbine comprising:
        a support structure;
        a cage rotor having a first axis, the cage rotor rotating about the first axis by motive fluids moving with a component perpendicular to the second axis, the cage rotor being pivotally mounted to the support structure about the second axis that is perpendicular to the first axis;
        a generator driven by the rotation of the cage rotor; and
        an actuator for adjusting the pivotal position of the cage rotor about the second axis independently of the fluid stream.

6. The combination of claim 5, wherein the support structure of the turbine is mounted directly or indirectly to the source of motive fluids.

7. The combination of claim 5, wherein the source of motive fluid is a combustion source, and the fluid stream is a stream of combustion products.

8. The combination of claim 5 wherein the cage rotor comprises blades along an outer periphery of the cage rotor that are driven by the motive fluids.

9. The combination of claim 5, wherein the first axis is horizontal, and the second axis is vertical.

10. The combination of claim 5, wherein the support structure of the turbine is mounted on a ground surface.

11. A method of generating power, comprising the steps of:
 providing a turbine comprising:
  a support structure;
  a cage rotor that rotates about a first axis, the cage rotor being pivotally mounted to the support structure about a second axis that is perpendicular to the first axis; and
  a generator driven by the rotation of the cage rotor to generate power;
 mounting the support structure adjacent to a fluid stream generated by a source of motive fluids;
 pivoting a cage support about the second axis independently of the fluid stream to position the cage rotor within the fluid stream; and
 generating power by causing the fluid stream to rotate the cage rotor.

12. The method of claim 11, wherein providing the support structure comprises mounting the support structure directly or indirectly to the source of motive fluids.

13. The method of claim 11, wherein the source of motive fluid is a combustion source, and the fluid stream is a stream of combustion products.

14. The method of claim 11, further comprising the step of mounting the support structure and pivoting the cage support such that the first axis of the cage is substantially perpendicular to prevailing winds.

15. The method of claim 11, wherein the first axis is horizontal and the second axis is perpendicular.

16. The method of claim 11, wherein providing the support structure comprises mounting the support structure on a ground surface.

* * * * *